United States Patent [19]

Pierce et al.

[11] Patent Number: 4,760,254
[45] Date of Patent: Jul. 26, 1988

[54] APPARATUS AND METHOD FOR ELECTRON SPIN POLARIZATION DETECTION

[76] Inventors: Daniel T. Pierce, 1353 Carlsbad Dr., Gaithersburg, Md. 20879; Robert J. Celotta, 14904 Piney Grove Ct., Gaithersburg, Md. 20878; John Unguris, 9405 Faith La., Damascus, Md. 20872

[21] Appl. No.: 742,233

[22] Filed: Jun. 7, 1985

[51] Int. Cl.$^4$ .................... G01N 27/00; H01J 40/00; H01J 47/00
[52] U.S. Cl. .................... 250/305; 250/306; 250/307; 324/71.3
[58] Field of Search ............ 250/305, 306, 492.1, 250/307; 436/173; 324/301, 304, 316, 71.3

[56] References Cited

U.S. PATENT DOCUMENTS 4,153,844  5/1979  Kirschner ............ 324/71.3
4,179,604  12/1979  Christou .
4,455,486  6/1984  Rau .................... 250/306

OTHER PUBLICATIONS

Kirschner et al, Physical Review Letters, vol. 42, pp. 1008–1011 (1979), Polarized Electrons.
Kessler, pp. 76–80, Sprague-Vinlag (1976).
IBM Technical Disclosure Bulletin, vol. 20, No. 10, pp. 4212, 4215, (1978).
Pierce et al, Review of Scientific Instrumentation, vol. 52, pp. 1437–1444, (1981).
Gray et al, Review of Scientific Instrumentation, vol. 55, pp. 88–91, (1984).
Jost et al, Journal of Physics Education: Scientific Instrumentation, vol. 14, pp. 735–741 (1981).

Primary Examiner—Craig E. Church
Assistant Examiner—T. N. Grigsby
Attorney, Agent, or Firm—Hall, Myers & Rose

[57] ABSTRACT

Provided herein are a device and a method for determining the spin polarization of an electron beam where the device and method contemplate diffusely backscattering the beam from an electron opaque target, at a kinetic energy less than 10,000 electron volts, collecting the scattered electrons which may be of a preselected energy range and within a predetermined solid angle relative to the target and the collector, and measuring the number of scattered electrons which were collected.

34 Claims, 7 Drawing Sheets

APPARATUS AND METHOD FOR ELECTRON SPIN POLARIZATION DETECTION

"The invention described herein may be manufactured and used by or for the Government of the United States of America for all governmental purposes without payment or any royalty".

TECHNICAL FIELD

This invention relates to electron spin polarization and more particularly, to the measurement of electron spin polarization via low energy diffuse scattering.

BACKGROUND OF THE INVENTION AND PRIOR ART

An electron, in addition to being characterized by its energy and momentum, is characterized by a quantity known as its spin. Quantum mechanical principles limit the possible values of the spin of an electron to plus(+) or minus(−) $h/(4pi)$, where h=Planck's constant. The plus or minus designations depend on whether the electron is oriented parallel (or "up") or antiparallel ("down") to a pre-selected arbitrary direction. A beam of electrons necessarily contains a large number of electrons where each individual electron contributes a spin, either up or down. If a greater population of one electron spin type exists in the beam, then the beam is spin polarized. The spin polarization of the beam is quantifiable by the following equation:

$$P=(N_{up}-N_{dn})/(N_{up}+N_{dn}),$$

where $N_{up}$ electrons have their spins in the up direction and $N_{dn}$ spins are pointing down. P represents the net orientation of the beam or ensemble of electrons. P values may range from +1 (all spins up), to 0 (an equal number of spins up and down), to −1 (all spins down).

As noted, the preselected "up/down" polarization axis is arbitrary as to where it is oriented relative to the coordinate system used for measurement. It is preferred, for purposes of interpretation, to employ a cartesian coordinate scheme where the determination of the cartesian components of the polarization of the electron beam, $P_x$, $P_y$, and $P_z$, is equivalent to the determination of the magnitude and direction of the polarization vector. A beam with vector polarization is further characterized as transversely polarized when the polarization is perpendicular to its velocity and longitudinally polarized, when the vector polarization is parallel to its velocity direction.

Known sources for producing beams of polarized electrons include photoemission from GaAs, described in U.S. Pat. No. 3,968,376; and secondary emission from a ferromagnet, as discussed by Unguris et al in *The Physical Review Letters* 47, 72(1982). Because an electron has a spin of $h/(4pi)$ and this spin has an associated magnetic moment of one Bohr magneton, a measurement of the electron spin orientation yields information about, for example, the origin of the electron or its interactions. An example of the uses of electron spin polarization for analytical applications includes the scattering of very high energy electrons ($10^{10}$ eV) from other elementary particles to test the violation of the physical law of parity conservation. Another use involves measurement of the interaction characteristics of an electron with an isolated atom, including measurement of the polarization of the electron before and after scattering. Such measurement demonstrates the extent of electron substitution within the atom and/or the degree of electron deflection from the atomic charge cloud. Additionally, spin polarization measurements may be used for probing solid materials in the case of ferromagnetic materials due to the fact that electrons emitted from a ferromagnetic material either by photoemission, field emission, or secondary emission can be used to characterize the magnetic nature of the material.

Information storage mechanisms now exist in which magnetic domains in ferromagnetic materials are oriented parallel or antiparallel relative to particular reference coordinates. The development of high density, magnetic storage mechanisms is contingent upon the microscopic investigation of magnetic domains which is enhanced by the use of electron polarization detection. Information so stored can be "read" by measuring the spin polarization of electrons emitted therefrom. Where a finely focused electron beam, e.g. a scanning electron microscope, generates electron emission from the magnetic domain of the information storage device, the spin polarization of the emitted electrons can be measured. Hence, it is possible to read information stored in much greater density, than, for example, can be used with optical microscopy.

The traditional means of measuring electron spin polarization is known as Mott scattering, after Sir Neville Mott. In 1932, Mott predicted theoretically that the scattering of an electron from an atom would depend upon the direction of the incident electron's spin if (1) the electron was scattered through an angle greater than 90 degrees as measured with respect to the incident beam direction, (0 degrees=forward scattering, 180 degrees=backscattering along the beam); (2) the nucleus from which the electron scattered had a high atomic number Z; and (3) the speed of the electrons approached the speed of light, that is, electrons with energies greater than 50,000 electron volts. Under these conditions, there is an interaction between the spin of the incident electron and the angular momentum associated with the trajectory of the electron scattering from the nucleus. If the incident electron beam has a spin polarization normal to the scattering plane, there is an observable difference in scattering probability for scattering at the same angle to the right or the left.

From this theory, the Mott polarization detector emerged. The Mott detector measures the backscattered intensity for equal angles to the right and left of the beam's incident direction to determine the degree of polarization normal to the scattering plane. The normal component to the scattering plane is defined as $$P_n=A/S, \text{ with } A=(I_L-I_R)/(I_L+I_R),$$

where A is the scattering asymmetry; $I_R$ and $I_L$ are respectively, the scattered electron intensities to the right side of the beam and the left, and S is the analyzing power which depends on the scattering target and the particular scattering geometry. Accordingly, the Mott detector employing a thin gold foil target in the thickness range of 300–1500 Angstroms, is calibrated to determine the effective analyzing power, S, by using theoretical calculations of the spin asymmetry in scattering 100,000 to 120,000 electron volt electrons.

To avoid the multiple scattering or absorption of elecltrons within the foil, since such effects are not accounted for in the theoretical model used to calibrate the detector, the Mott detector employs very thin gold foils for the target. The calibration of the detector involves a series of measurements of polarized electron beam scattering for well-defined geometries as a function of the target foil thickness.

The Mott device suffers reduced efficiency as a result of many of the incident electrons passing through the scattering target, i.e. the target is not opaque to the electron beam. At 100,000 electron volts, the target is not opaque to the high energy electrons where the mean free path of the electrons is sufficiently long so that many pass through the thin gold foil. As a result of using thin foils to minimize scattering typically only about 0.01% of the electrons entering the device are back scattered into the detectors actually used in the measurement. In contrast, low energy electrons (with energies less than a few thousand electron volts) are much more strongly interacting and are stopped by a gold foil of 300 Angstroms. The target opacity depends on both the electron energy and the target density.

There are a number of additional disadvantages of the Mott spin analyzer for measurement of electron spin polarization: (1) the intensity asymmetry occurs over a range of scattering angles where the scattering cross section is quite small, resulting in small signals to be detected. (2) The apparatus is very bulky owing to the high voltage isolation and safety region required for 100,000 volt operation, and (3) The analyzer and detectors are not readily movable to allow measurement of polarization of electrons being emitted by different sources or a source in different directions.

The next advances in this art evolved during the 1960's when it was discovered electron scattering at low energies (<1000 electron volts) from a mercury atomic beam was possible. At such energies, the scattering is from the entire atom (nucleus plus electrons) rather than from the nucleus alone. Although avoiding the apparatus problems associated with the high voltage Mott Detector, the mercury atomic beam provides a target of significantly lesser density than that provided by the Mott gold foil target. Consequently, the scattering efficiency is very small. Furthermore, these devices generate a small angular range over which significant scattering asymmetry occurs and a minimal scattered intensity. An additional physical consideration, somewhat disadvantageous, is based on the necessity to employ large vacuum pumps to maintain sufficiently low vacuum in the presence of a mercury atom beam. Moreover, depending on the application, the mercury beam is often corrosive. Also, like the Mott Detector, the mercury atomic beam suffers detection inefficiencies caused by the target not being opaque to the electron beam. These inefficiencies are caused, in the case of the mercury atomic beam, by low target density.

A more recent development in spin polarization analysis was introduced by Kirschner and described in U.S. Pat. No. 4,153,844. The Kirschner detector is distinguishable from the above-described devices as it employs an opaque monocrystal scattering target for determining electron spin dependent interactions. The spin dependent interaction is the spin orbit interaction in the scattering of the incident electrons from the monocrystal. The monocrystal presents an orderly arrangement of atoms in crystal planes which, upon electron beam impingement, causes the electrons to be diffracted backward into well defined beams. These beams of scattered electrons are symmetrically spaced relative to the electron beam incident on the monocrystal surface. Significant multiple scattering occurs which cannot be reliably calculated thereby necessitating experimental calibration.

While the Kirschner device is compact and allows operation at low voltages, it has several disadvantages:

(1) The actual intensity of any two symmetrically diffracted beams which would be used for a polarization measurement is small, typically 0.1% of the incident beam.

(2) The angular spread of the incident electron beam at the monocrystal target is required to be less than two degrees, which in turn limits the variety of electron beams which can be analyzed. Being dependent on diffraction from the crystal planes, the device severely constrains the relative alignment of the incident electron beam, the planes of the atoms in the monocrystal, and the position of the detectors for the backscattered electrons. Where impingement of electrons is not perpendicular to the monocrystal, those electrons are diffracted in different directions, and consequently, are no longer symmetrically displaced about the incident beam. Thus, the Kirschner detector provides a minimal angular range for significant scattering asymmetry suitable for spin polarization detection.

(3) The angle of diffraction also changes with incident electron energy and at an incorrect energy, the diffracted beams may be shifted off the detector. In order to employ the monocrystal as a detector, the spread of energies of the electrons in the incident beam, is necessarily less than 5 electron volts. Furthermore, the detector's analyzing power decreases rapidly when the beam energy changes from the optimum energy and may even change sign leading to inaccurate or erroneous results.

(4) Due to very sensitive, surface diffraction, a Kirschner monocrystal surface must be cleaned to be free from any contaminants and maintained in ultrahigh vacuum. Such cleaning a surface involves heating to high temperatures in ultrahigh vacuum ($<10^{-9}$ Torr), treating with specific gases at specific temperatures, or bombarding with rare gas ions followed by an annealing process. For example, in Kirschner, a tungsten monocrystal is cleaned by heating to 1800° K. in $10^{-6}$ Torr of oxygen for a period of order 10 minutes every few days. Between these treatments the crystal surface must be cleaned periodically (every 15–30 minutes) by heating rapidly to 2500° K. in vacuum.

The analyzing capability of the above-described detectors may be arithmetically quantified in a figure of merit, $FM=S_2I/I_o$, when the statistics of the measurement are the limiting factor. Thus, it is desirable to maximize S, the analyzing power, as well as to maximize the fraction representing the intensity of the scattered electrons I measured in the collector divided by incident electron beam intensity $I_o$. With reference to the figure of merit, the angular and energy spread are not included in the conventional calculation, $FM=S^2I/I_o$, because only the $I_o$ reaching the target is applicable. In general applications with the Kirschner device, it is necessary for the electron optics to reject much of the electron beam before it reaches the target surface so as to satisfy the severe constraints on spread in angle and energy. Consequently, the $I_o$ at the target is much smaller and the measurement signal is severely decreased. Even though a figure of merit of $10^{-4}$ can be achieved for the Kirschner monocrystal analyzer, under optimal conditions, the monocrystal device is efficient only for well collimated beams with narrow energy spread. Moreover, the monocrystal device requires the elimination of any inelastically scattered electrons, (usually those which have lost over 10 electron volts of energy in the scattering process) which results in a loss in useful scattering intensity.

In view of the foregoing, it is evident that there has long been a need for a simple, efficient and compact spin polarization detector.

SUMMARY OF THE PRESENT INVENTION

An object of this invention is to provide an efficient means and method to measure electron spin polarization that is of compact and elegant construction.

It is a further object of this invention to minimize constraints on the angular and energy distributions of the electron beam to be measured.

It is yet another object of the invention to provide a polarization detection means in which the scattering target surface is easily prepared, is subject to minimum constraints on its alignment, and can be chosen to provide stable spin dependent characteristics for relatively long periods of time.

Still another object of this invention is to provide a means of electron spin polarization measurement as efficient or more efficient than the prior art.

These and other objects are satisfied by a device for determining the spin polarization of a beam of electrons comprising, beam energy control means for controlling the kinetic energy of the electron beam to less than 10,000 electron volts, target means for impingment of said electron beam, said target means being opaque to said electrons and causing said electrons to diffusely scatter therefrom, collecting means for collecting said electrons scattered within a selected solid angle from said target means, and means for measuring the number of electrons collected from said collecting means.

Also the foregoing objects as well as additional objects are satisfied by a method for determining the spin polarization of beam composed of electrons, comprising the steps of; controlling an electron beam to have an energy of less than 10,000 electron volts, passing the beam to an opaque target, diffusely scattering the electrons from the atoms comprising the target, collecting the diffusely scattered elelctrons in a selected solid angle, and measuring the number of electrons collected.

Turning now to a primary characteristic of the invention, the target surface is easily prepared from polycrystalline or amorphous metals such as gold, mercury, platinum, lead, bismuth, uranium or a semiconductor such as mercury telluride. The film may be deposited on an appropriate substrate by sputtering or evaporation. Alternatively, the surface of a piece of polycrystalline or amorphous material can be cleaned by conventional means to provide the target surface. In one embodiment of the invention the scattering surface is an evaporated gold film. Gold being a noble metal is desirable as a stable target due to its especially nonreactive characteristics.

A scattering target, composed of a polycrystalline film, provides sizeable spin dependent asymmetry in the scattering, and this analyzing power is useful over a broad range of incident beam energies. The combination of the enhanced energy range and relaxed constraints on the angular divergence of the incident beam gives the present invention a great advantage over the monocrystal spin analyzer as it provides an acceptable detector for a broader range of electron beams.

A key feature of this invention is to scatter electrons diffusely at low energies from the polycrystalline or amorphous metal or semiconductor target surface and collect those electrons as well as inelastically scattered electrons. Such a target surface is of sufficient density so as to be substantially opaque to the incident electron beam—electrons do not pass through it. In the absence of coherent diffraction generated by the continuous planes of atoms in the monocrystal, scattering from the target surface is diffuse. As a result, scattering is generated from individual atoms, rather than from the crystal planes as in the diffraction from a monocrystal. Because the electron scattering depends not on the orientation of the surface but on the scattering angle, the constraints on the angular divergence of the incident electron beam and on the alignment of the sample surface are minimized. The relative weakness of the scattered intensity at a particular scattering angle is compensated by collection of the scattered electrons over a large solid angle.

The present invention further contemplates that the electron scattering shall take place for electron kinetic energy on the order of $10^1$–$10^3$ electron volts. At these energies the spin analyzer can be constructed into a very compact unit (first-sized or less). In view of its relatively diminutive size, it is small enough to be attachable and movable. For example, it may be employed as an energy analyzer inside the vacuum chamber of an angle resolved photoemission apparatus or in other applications the spin analyzer can be enclosed in its own small vacuum chamber.

The instant invention also detects inelastically scattered electrons which still contribute significantly to the spin dependent asymmetry and can be used to enhance the signal. Returning to the embodiment contemplating scattering from a gold film at 150 electron volts kinetic energy, all scattered electrons which have at least 40 electron volts of kinetic energy in the direction normal to the collector can be used leading to a significant increase in efficiency. A figure of merit of $10^{-4}$ is readily achieved by this invention when employing a polycrystalline gold film and electron kinetic energies of 150±20 electron volts. The device even operates using a larger energy deviation (±75 electron volts) from the mean incident kinetic energy. In this case the figure of merit is reduced only by a factor of two which in certain applications may be justified because an energy selector is no longer necessary.

Control of the electron beam is readily accomplished by conventional electron optical means such as electrostatic or magnetic lenses and deflection plates which transport, change the energy, and focus the beam whereby the beam achieves the appropriate angular divergence and mean energy. As noted above, the use of an electron energy selector assists to limit the energy spread of the electrons about the mean energy. After the electrons of the preselected energies impinge approximately perpendicular on the target, the diffusely backscattered elelctrons are collected in a collector.

There are other features contemplated by the present invention. The addition of an elecltron multiplier assembly enhances electron signal to the detector. Low energy secondary electrons can be prevented from reaching the target by establishing a retarding electric field between the target and the collector with appropriate grids. An additional electron optical means may be employed to change any longitudinal component of electron spin polarization to a transverse component.

A further advantage of this invention is that it is fully compatible with ultra-high vacuum but only high vacuum is required. For example, the analyzing power S of a polycrystaline gold film scattering target was found to decrease only 8% on exposure to air at a pressure of $10^{-7}$ Torr for 3.5 days. This suggests that a similar decrease could be expected only after more than a month of use at typical operating pressures of $10^{-8}$ Torr or less.

The instant invention may be used in other ways too. For example, it is sometimes advantageous to detect the signal composed of all the electrons incident on the target without making a polarization measurement. This might occur when an adjustment of experimental parameters needs to be made where a signal whose intensity has not been degraded by scattering from the target is required. In this case the target may be biased negatively. Thus, the potentials of the electrodes surrounding the scattering region can be adjusted to prevent the incident electrons from reaching the target and to guide them to the entrance of the backscattered electron collector. In this way, it is easy to switch from making a spin resolved measurement to a non-spin resolved measurement and still use the same signal acquisition system.

Other features and advantages of this invention will become more apparent from the following description taken in connection with the illustrated embodiments in the accompanying drawings.

DETAILED DESCRIPTION OF THE ILLUSTRATED EMBODIMENT

Figure 1:
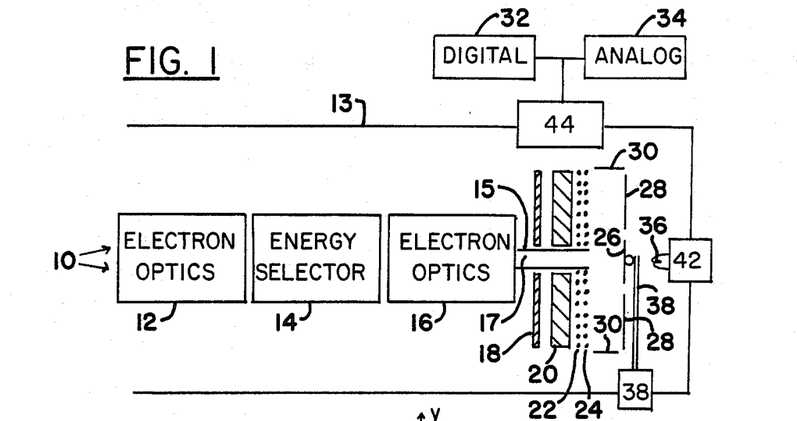
FIG. 1 is a schematic and block diagram of one embodiment of the invention.

Referring to FIG. 1, electrons in free space 10, may be generated by any source such as field emission, photoemission, secondary emission, or an electron scattering process (not illustrated). The electrons enter the electron optics 12 where they are transported, accelerated or decelerated, focused and guided by conventional electrostatic and/or magnetic electron lenses and deflection plates designated electron optics 12. In one embodiment, optics 12 consist of a one inch (interior diameter) copper cylinder with 0.1 inch gaps at the cylinder ends. Each of the copper lens elements are electrically insulated from each other by alumina spacers.

Because the spread in energies of the electron beam acceptable at the scattering target is very large, 100 electron volts, the electron energy selector 14 need not have high energy resolution. Any of a number of conventional types such as a cylindrical or spherical condenser type or a plane or cylindrical mirror type is suitable. One example of a suitable energy selector consists of a spherical deflector with a mean radius of 10 centimeters and potentials of 1811 and 1244 volts respectively to provide a pass energy of 1500 volts.

When selector 14 is operated at a mean energy of 1500 electron volts with 4 mm slits, electrons 10 which have an energy spread of 30 electron volts full width at half maximum pass through selector 14. Electrons 10 escaping energy selector 14 move to electron optics 16 which changes the kinetic energy of electrons to 150 electron volts. Also electrons 10 are then focused to pass through a copper drift tube 15 to guide the electrons through central holes 17 in collecting anode 18, channel multiplier assembly 20, grids 22 and 24, and onto polycrystalline gold film target 26. The drift tube 15 prevents the electrons from seeing the potential on elements 18, 20, 22, and 24 and is insulated from these elements by a 0.005 inch thick Kapton spacer (Dupont trademark). The drift tube 15 limits the cone angle of the elecltron beam to approximately 18°.

Referring briefly to collecting anode 18 in the described embodiment, it is composed of a 2.5 inch diameter, 0.125 inch thick pyrex plate and coated by vacuum evaporation with a 300 Å chromium film, which in turn was evaporation coated with a 5000 Å gold film. The intermediate chromium layer is employed to improve the adhesion of the gold to the glass. A half-inch diameter hole is provided for insertion of drift tube 15 and six holes are provided on the outer periphery to permit the anode to be attached to channel plate assembly 20. Preferably, alumina spacers separate anode 18 from assembly 20 by approximately 0.15 inches.

Channel plate assembly 20 has a circular chevron configuration with a 2.5 inch outer diameter and a 0.25 inch cental bore. One such assembly is the Model 3040 available from Galileo Electro-Optics Corp. of Sturbridge, Mass. In the particular arrangement described here, anode 18 and assembly 20 are biased by a resistor divider which provides anode 18 with a voltage of 0.9 $V_o$, the back of the channel plate with a voltage of 0.8 $V_o$ and the front of the channel plate with a voltage of 0.15 $V_o$ where $V_o$ ranges from 1500 to 3000 volts with respect to the target 26.

Grids 22 and 24, approximately 2 inches in diameter, are constructed from 100 line/inch, 0.001 inch diameter stainless steel wire mesh mounted by spot welding onto a circular frame. Each grid has an approximately 6 mm hole punched through its center. Grid 24 is separated from target 26 by 0.24 inches, and grid 22 by 0.07 inch and channel assembly 20 is separated from grid 22 by 0.11 inches. Both grids 22, 24 and channel plate 20 may be flat, curved or otherwise conform to any desired geometry.

Returning now to the function of the invention, only electrons 10, diffusely scattered in the field free region created by the shield 28 and the grid 24 at the potential of a gold target 26, reach grid 24 in an angular range of from 125 to 155 degrees. The provision of electrode 30, concentric with the scattering region, permits adjustment of the solid angle of the scattered electrons that reach collector 18. In this embodiment, both shield 28 and electrode 30 are constructed from 0.02 inch molybdenum sheeting.

The electrons scattered from the target 26 pass through the grid 24 to the grid 22. Grid 22 having a negative potential of −40 volts with respect to the potential of target 26, serves to limit the range of energy loss and accordingly, retards the low energy secondary (inelastic) electrons created upon electron beam scattering from the target. Only electrons with sufficient energy to pass grid 22, i.e. all electrons leaving the target with kinetic energy greater than 40 electron volts, reach channel multiplier assembly 20 which emits a pulse of $10^6$ electrons from its opposite surface per each electron incident on the assembly. These electrons are accelerated through a potential of approximately 0.1 volts between the exit side of the channel plate assembly 20 and the anode 18 where they are collected and detected through the use of conventional digital pulse counting assembly 32. When the electron population passing grid 22 is large, the gain of the channel multiplier assembly 20 can be reduced, or alternatively, assembly 20 can be omitted entirely, and the number of electrons reaching sectored anode 18 can be measured by conventional analogue means 34.

Gold film target 26 is formed by evaporation of gold onto an abraded 0.020 inch thick tantalum blank. Gold is deposited from an evaporator 36 incorporating 0.01 inch tungsten wire filament by turning the gold film target substrate 26 toward the evaporator 36 with rotary motion vacuum feedthrough 38. A 5 amp current is passed through the filament for 15 seconds followed by 8.5 amps for 10 seconds. Evaporator 36 is connected to an electrical feedthrough 42 which passes through the wall 13.

Figure 2:
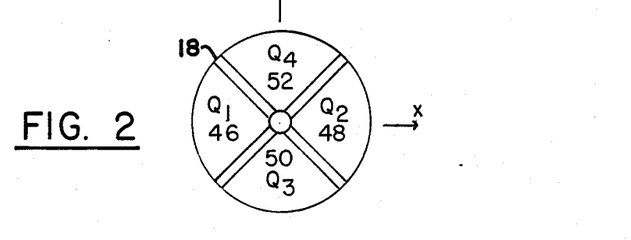
FIG. 2 is a diagramatic representation of a four quadrant collecting anode.

Referring to FIG. 2, the particular arrangement of collector anode 18 is illustrated. The four discrete quandrants of 46, 48, 50 and 52 of the collector anode 18 consist of metallic films deposited on an insulating substrate as described above. Each anode is electrically isolated from the others and connected independently to the signal processing electronics through feedthrough 44 (see FIG. 1). Quadrants 46 and 48 oppose each other along the X direction and, likewise, quadrants 50 and 52 in the Y direction.

The asymmetry of the diffusely scattered currents $I(Q_1)$ and $I(Q_2)$, at quadrants 46 and 48, respectively, determine the Y component of the transverse polarization according to, $$P_y = \frac{1}{S} \frac{I(Q_1) - I(Q_2)}{I(Q_1) + I(Q_2)}$$

where S is the effective analyzing power of the gold target for the given geometry. Correspondingly, the asymmetry in the diffusely scattered current, measured in quadrants 50 and 52 of the sector collector, determine the X component of the transverse polarization. Alternatively, any conventional position-sensitive detector can be employed.

Figure 3:
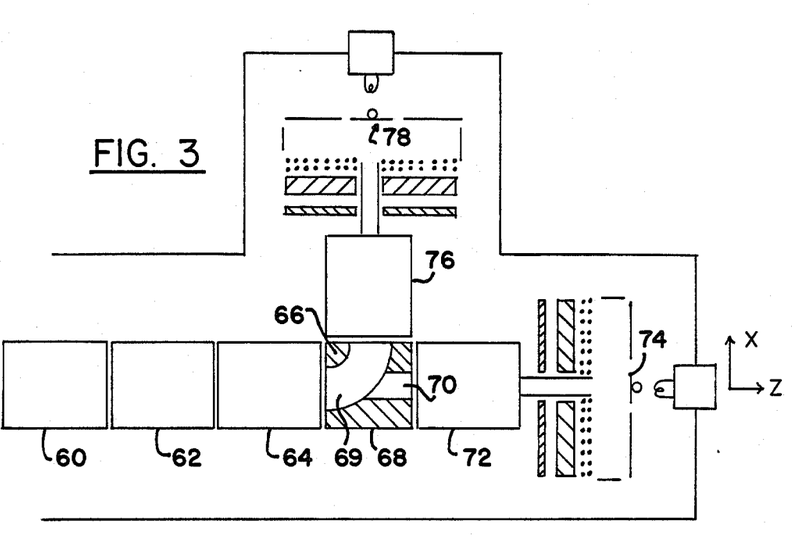
FIG. 3 is a schematic and block diagram of an alternative embodiment of the invention which measures all three components of the polarization vector.

Moving now to FIG. 3, an alternative embodiment contemplating measurement of the third component of the polarization vector is depicted. Transport optics 60, an energy selector 62 and further transport optics 64 are equivalent to elements 12, 14 and 16 in FIG. 1. However, as an electron beam enters a 90 degree sector of a spherical condensor with inner and outer sections 66 and 68, respectively, having a zero potential difference therebetween, the electron beam passes through aperture 70 formed in outer section 68. Once the electron exits from aperture 70, optics 72 change its energy and focuses it to impinge onto target 74. As this apparatus and sequence correspond to that described above in FIG. 1, the X and Y components of polarization are measured.

However, if a non-zero potential is applied between the condensor sections 66 and 68 sufficient to deflect the beam 90 degrees toward optics 76 and onto corresponding gold foil target 78 (disposed at right angles to gold foil target 74), the deflection changes the direction of the electron beam without changing the direction of the electron spin. The Z component of the polarization, formerly in the direction of the electron beam (longitudinal polarization), is now transverse to the electron velocity. Thus, the Z component can be measured by scattering in the same manner as that described above. The Y component is measured redundantly by such scattering which is useful for balancing the sensitivity of the signal detection channels associated respectively with scattering from gold film targets 74 and 78.

In reference to the hardware employed for switchyard condensor 69, it is comprised of 0.6 inch radius, inner quarter sphere 66 and matched 1.0 inch radius, outer quarter sphere 68 with 0.2 inch diameter aperture 70 centrally disposed therethrough. With this arrangement, in order to achieve orthogonal beam deflection at the 1500 volt pass energy, 2501 volts must be applied to member 66 and 900 volts to member 68.

Figure 4:
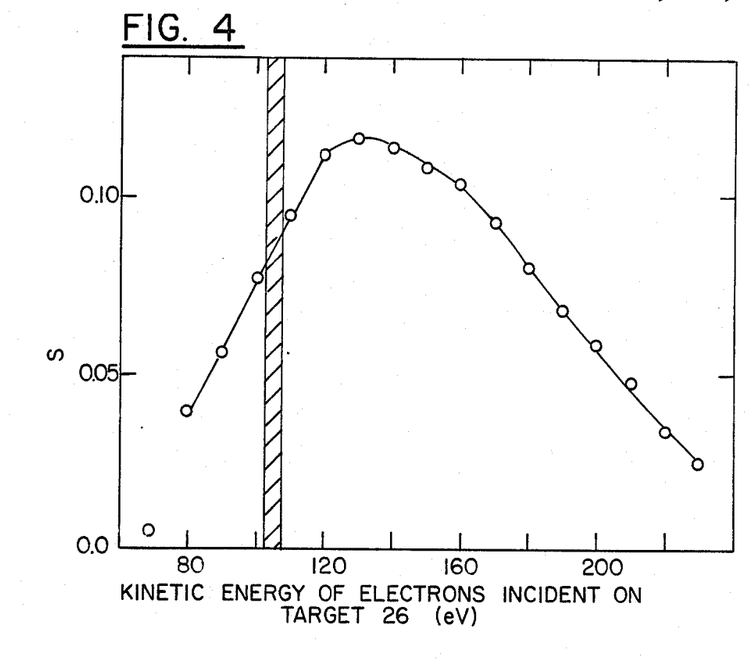
FIG. 4 is a graph representing the relationship between the analyzing power and the electron beam kinetic energy at an evaporated gold film target according to this invention.

Turning now to FIG. 4, there is illustrated in graph form the analyzing power of this invention for different kinetic energies of the electrons hitting the target. The analyzing power is useful for electrons over a wide energy range, and is, in fact, greater than one-half its maximum value over a 120 electron volt range. One important aspect illustrated by FIG. 4 is that the analyzing power does not change sign. As long as the sign of S does not change at a given energy, then electrons at that energy can add usefully to the signal of the polarization measurement. For the purpose of comparative illustration, the analyzing power of the Kirschner device is represented by the shaded area. Although at optimum conditions that device performs well, it exhibits an extremely narrow functional range particularly, in contrast to that provided by this invention.

Figure 5:
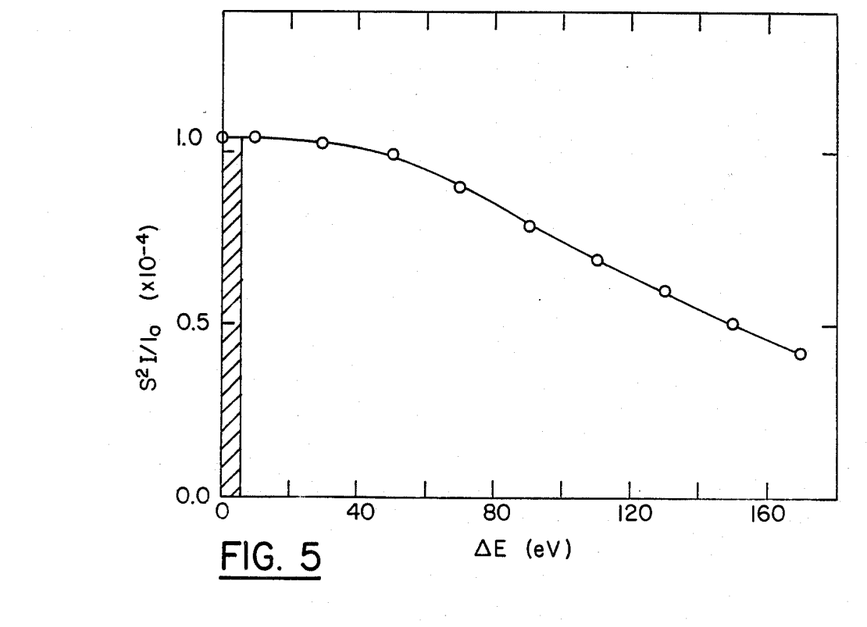
FIG. 5 illustrates the relationship between the average figure of merit of this invention as a function of the energy spread $\Delta E$ of the incident beam.

Referring now to FIG. 5, there is shown the figure of merit averaged over an energy spread, $\Delta E$, of an incident beam of constant total intensity. The average figure of merit for a beam with a 40 electron volt energy spread is $1 \times 10^{-4}$, while that for a beam with a 120 electron volt energy spread is $0.64 \times 10^{-4}$. If the incident beam was not of constant total intensity, but rather of constant intensity as a function of energy, the intensity in the 120 electron volt energy spread would be three times that in the 40 electron volt energy spread. FIG. 5 illustrates the advantageous increase in signal possible in many situations because the invention can measure an electron beam with wide energy spread with high efficiency. Once again, the limitations of the Kirschner device is underscored by its relatively narrow functional range (see shading).

Figure 6:
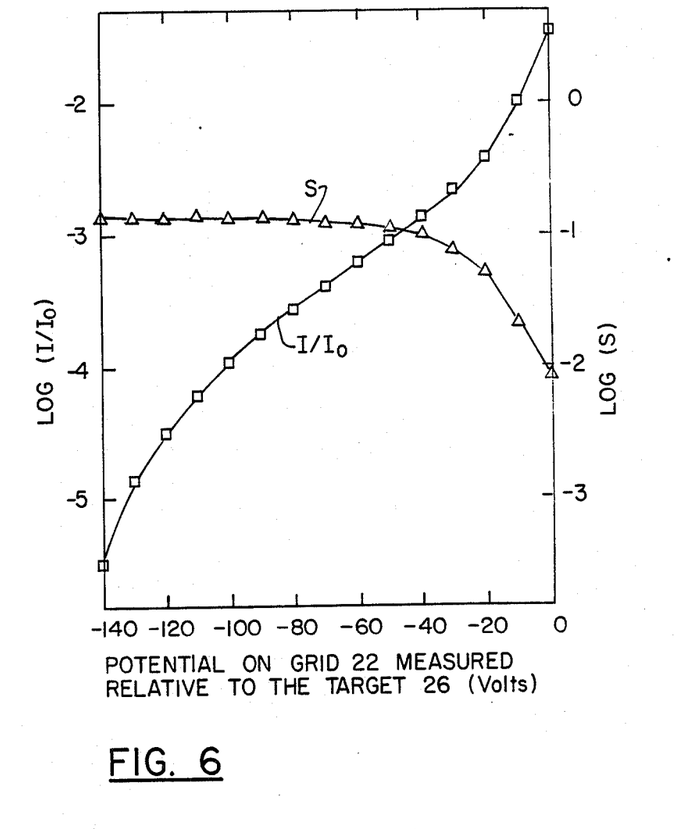
FIG. 6 is a graphic representation of the relationship between the analyzing power and the collected intensity according to this invention.

The graph presented in FIG. 6 illustrates the relationship between the analyzing power and the collected intensity for a nominal beam kinetic energy of 150 electron volts, where both quantities are a function of the potential on grid 22 as measured with respect to the target 26, which as detailed above, determines which energy scattered elelctrons are collected. The log of the analyzing power, log (S), is located on the right and on the left is the log of the intensity ratio, log ($I/I_o$), where I is the intensity scattered into two selected quadrants, e.g. 46 and 48 (see FIG. 2) and $I_o$ is the intensity of the incident beam. The potential on grid 22 ranging from −140 to 0 volts comprises the abscissa. For a grid 22 potential of −140 volts, all electrons leaving target 26 with an energy of motion normal to grid 22 greater than 140 electron volts are collected and the analyzing power is high but the intensity is low. At the grid potential of −40 volts, all of the electrons which have lost at target 26 up to 100 electron volts of the energy of motion normal to grid 22 are collected. The analyzing power decreases only slightly from 0.13 to 0.10, but the intensity has increases by a factor of $10^3$. When grid 22 is at zero volts, the same potential as the target 26, all electrons are collected.

Figure 7:
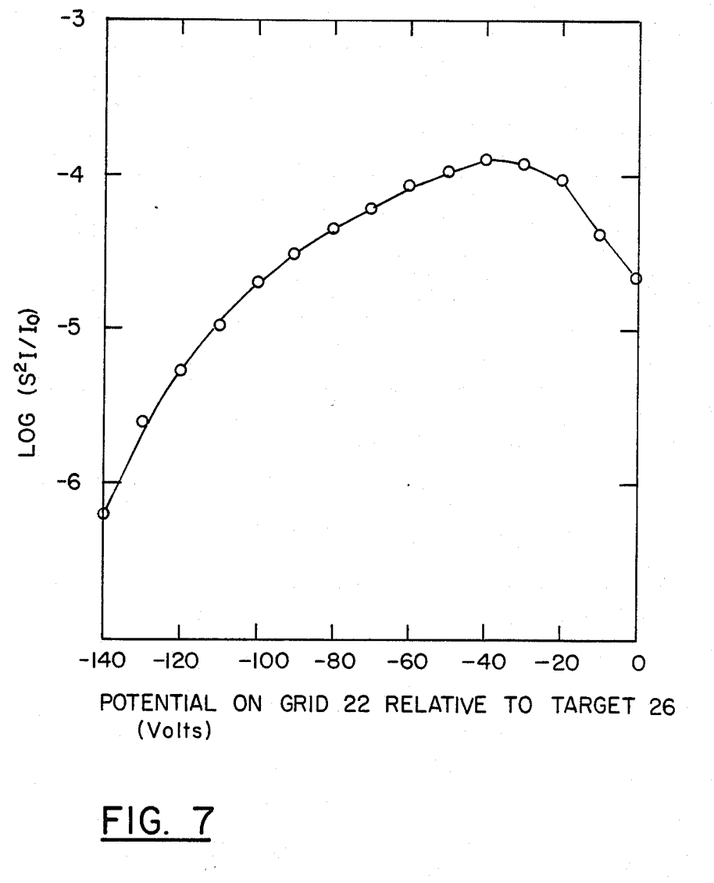
FIG. 7 illustrates the figure of merit $S^2 I/I_o$ representative of the present invention.

Finally, in FIG. 7, the relationship between the figure of merit $S^2I/I_o$ and potential of grid 22 is illustrated. The figure of merit which can be computed from FIG. 6, rises with increasing grid potential as a result of the increase in $I/I_o$ (see FIG. 6). Thus, for the 150 electron volt incident beam kinetic energy of this case, and at the preferred operating potential for grid 22, which is −40 volts with respect to target 26, the figure of merit is $1.04 \times 10^{-4}$.

The skilled artisan can surmise alternative operations for the above-described embodiments. For example, returning to FIG. 1, if it is desirable to detect the entire incident electron beam 10 undiminished by scattering from the gold target 26, the target 26, the shield 28, and the concentric electrode 30 are biased negatively to a voltage such as to retard the electron beam. Thus, a corresponding retardation of the progress of electrons 10 from electron optics 16 to target 26 is achieved. These electrons are then collected by anode 18 after being reflected backward prior to scattering from the gold film target 26 and pass through grids 22 and 24, and multiplier assembly 20. The beam intensity is thereby measurable by the digital pulse counting assembly 32 or the analogue counter 34 (depending on the size of the signal to be measured). For this case, only the sum of the intensities to be measured by the sector detectors is of importance.

Given the foregoing illustrations, variations and modifications of the invention should now be readily apparent to one of ordinary skill in the art without undue experimentation. As the description is intended to be illustrative and not limiting, such variations and modifications are intended to fall within the scope and spirit of the invention which is defined by the following claims.

We claim:

1. A device for determining the spin polarization of a beam of electrons comprising:
   (a) beam energy control means for controlling the kinetic energy of the electron beam to less than 10,000 electron volts,
   (b) target means for diffusely scattering electrons from said electron beam and being substantially opaque to and positioned in said electron beam,
   (c) collecting means for collecting said electrons diffusely scattered from said target means within a selected large solid angle,
   (d) means for detecting the number and relative position of electrons on said collecting means to measure spin dependent asymmetry.

2. A device according to claim 1 further comprising signal enhancing means for enhancing the signal of the scattered electrons from said target, said enhancing means being disposed between said collecting means and said target.

3. A device according to claim 2 where said enhancing means is at least one electron multiplier plate.

4. A device according to claim 1 further comprising angle control means for adjusting the size of the solid angle of the electrons diffusely scattered by the target means and which are collected by the collecting means.

5. A device according to claim 4 where the target means is composed of polycrystalline gold and electrons with scattering angles between 125° and 155° are passed to the collecting means.

6. A device according to claim 1 where said collecting means is divided into a plurality of sectors for measuring the scattering asymmetry relative to the electron beam.

7. A device according to claim 1 further comprising means to prevent low energy secondary electrons generated from said target means from reaching said collecting means.

8. A device according to claim 7 where said means comprises at least one electrified grid disposed between said target means and said collecting means.

9. A device according to claim 1 where said target means comprises a polycrystalline metal.

10. A device according to claim 1 where said target means comprises an amorphous metal.

11. A device according to claim 1 where said target means comprises a polycrystalline semiconductor.

12. A device according to claim 1 where said target means comprises an amorphous semiconductor.

13. A device according to claim 1 further comprising a second target means and collecting means disposed perpendicularly to the first target and collecting means and a means for switching the electron beam to impinge on said second target such that all three components of the polarization vector can be determined.

14. A device according to claim 1 further comprising means for selecting a desired range of kinetic energy of said beam.

15. A device according to claim 1 further comprising a second target means and collecting means disposed at an angle to the first target and collecting means and a means for switching the electron beam to impinge on said second target such that all three components of the polarization vector can be determined.

16. A device according to claim 1 where the target means is composed of a polycrystalline or amorphous material.

17. A device according to claim 1 further comprising concentric means to adjust the angle of collection of electrons scattered from the target.

18. An apparatus for determining the polarization of an electron beam, comprising:
   (a) means for controlling the kinetic energy of the electron beam to an energy less than 10,000 electron volts,
   (b) means for selecting a specific energy range of the beam,
   (c) target means for diffusely scattering the electrons from said electron beam,
   (d) means for rejecting low energy secondary electrons emitted from said target,
   (e) means for collecting the electrons scattered in a large solid angle from said target, said means including sectored means for identifying the relative position of electron impingement on said collecting means,
   (f) means for adjusting the solid angle of the scattered electrons impinging on the collecting means, (g) means for measuring the number of electrons collected in each sector of said collecting means to determine the spin dependent asymmetry.

19. A method for determining the spin polarization of a beam composed of electrons, comprising the steps of:
   (a) controlling an electron beam to have an energy of less than 10,000 electron volts,
   (b) passing the beam to a substantially opaque target means for diffusely scattering electrons from the electron beam,
   (c) collecting in a collector the diffusely scattered electrons over a selected large solid angle,
   (d) detecting the number and position of the collected electrons over the selected large angle in the collector, and
   (e) measuring the spin dependent asymmetry of the scattered electrons.

20. A method according to claim 19 including the further steps of scattering electrons from a second target and measuring the three components of the polarization vector.

21. A method according to claim 19 further including the step of changing the longitudinal beam polarization to a transverse beam polarization.

22. A method according to claim 19 further including the step of rejecting low energy secondary electrons emitted from the target.

23. A method according to claim 22 further including the step of enhancing the signal produced by the scattered electrons emitted from the target.

24. A method according to claim 19 further including the step of adjusting the solid angle of collection of the diffusely scattered electrons.

25. A method according to claim 24 further including the step of selecting scattered electrons having a predetermined range of kinetic energy.

26. An electron spin polarization detector for magnetic domain structure analysis, achieving a figure of merit of a magnitude of approximately or greater than $10^{-4}$, comprising:
   (a) means for providing an elelctron beam to impinge on the target,
   (b) means for adjusting the electron beam to have an energy of less than 10,000 electron volts,
   (c) means for maintaining energy of the electrons to within a range of 100 electron volts,
   (d) target support means for supporting a selected target,
   (e) target means for incoherently scattering electrons within a large selected solid angle, said target means being supported by said target support means,
   (f) collector means for collecting the incoherently scattered elecltrons within said large selected solid angle, and
   (g) detector means for detecting the number and relative position of the scattered electrons to measure spin dependent asymmetry.

27. A detector according to claim 26 where the detector means is divided into sectors.

28. A detector according to claim 26 further comprising a shield and electrode to permit adjustment of said large selected solid angle over which the scattered electrons are collected.

29. A detector according to claim 26 further including electron energy selection means disposed between the target support means and the collector means for selecting and passing through to the collector means only scattered electrons of selected energy.

30. A detector according to claim 29 where the electron energy selection means comprises an electrified grid.

31. An electron spin polarization detector for analysis of magnetic domains of a sample, comprising:
   (a) a target composed of a polycrystalline or amorphous material selected from the group consisting of gold, platinum, mercury, lead, bismuth, uranium, or a semiconductor material,
   (b) target support means for supporting said target,
   (c) electron beam generation means for generating an electron beam directed to the target where the kinetic energy of the electrons within the electron beam is less than 10,000 electron volts, and within a range of 100 electron volts,
   (d) means for selecting electrons, emitted in an incoherent pattern from the target, which are within a selected large solid angle,
   (e) means for selecting electrons which have desired energies,
   (f) means for collecting and counting the selected electrons within said large solid angle, and
   (g) means for determining the electron spin polarization of a beam incident on the target.

32. A detector according to claim 31 further comprising depositing means for producing the target featuring an electrifiable filament.

33. Apparatus for analysis of spin polarization, comprising:
   (a) a target composed of polycrystalline or amorphous material selected from the group consisting of gold, platinum, mercury, lead, bismuth, uranium or a semiconductor material,
   (b) electron beam generator,
   (c) electron beam energy control means for controlling beam energy to less than 10,000 electron volts and within a range of 100 electron volts,
   (d) electron beam focusing means for focusing the electron beam on the target,
   (e) electron selector means for selecting electrons diffusely scattered from said target upon impingement of the electron beam, said selector means allowing electrons of only sufficient kinetic energy to pass through the selector to the collector means,
   (f) collector means for collecting electrons passing through the selector means, said collector means being sectored to permit detection of electron spin assymmetry, and
   (g) means for analyzing and recording the detected electron assymmetry.

34. A method for analyzing the spin polarization of an electron beam to achieve a figure of merit of approximately or greater than $10^{-4}$, comprising the steps of:
   (a) generating an electron beam having an energy of less than $10^4$ electron volts and maintaining the beam energy within a range of $10^2$ electron volts,
   (b) focusing the electron beam on target means for diffusely scattering electrons,
   (c) collecting the scattered electrons within a selected solid angle,
   (d) detecting the pattern of said scattered electrons
   (e) analyzing the pattern of the scattered electrons within the selected solid angle to determine spin dependent asymmetry which is indicative of the electron spin polarization.

* * * * *